United States Patent
Pacheco et al.

(10) Patent No.: US 12,493,302 B2
(45) Date of Patent: Dec. 9, 2025

(54) LONGITUDINAL TRIM CONTROL MOVEMENT DURING TAKEOFF ROTATION

(71) Applicant: EMBRAER S.A., São José dos Campos-SP (BR)

(72) Inventors: Bruno Rangel Pacheco, São José dos Campos (BR); Daniel Paulo de Tarso Ferreira, São José dos Campos (BR); Gustavo Jose Zambrano, São José dos Campos (BR)

(73) Assignee: Embraer S.A., São José dos Campos-SP (BR)

( * ) Notice: Subject to any disclaimer, the term of this patent is extended or adjusted under 35 U.S.C. 154(b) by 712 days.

(21) Appl. No.: 17/351,519

(22) Filed: Jun. 18, 2021

(65) Prior Publication Data

US 2021/0405658 A1    Dec. 30, 2021

Related U.S. Application Data

(60) Provisional application No. 63/043,897, filed on Jun. 25, 2020.

(51) Int. Cl.
*G05D 1/652*    (2024.01)

(52) U.S. Cl.
CPC .................. *G05D 1/652* (2024.01)

(58) Field of Classification Search
CPC ........... B64C 5/02; B64C 9/00; B64C 13/042; B64C 13/16; B64C 13/503; B64C 5/16; B64C 13/18; B64D 45/0005; B64D 45/00
See application file for complete search history.

(56) References Cited

U.S. PATENT DOCUMENTS

| | | | |
|---|---|---|---|
| 5,201,478 A | 4/1993 | Wooley | |
| 8,014,910 B2 | 9/2011 | Mathieu et al. | |
| 2005/0178899 A1* | 8/2005 | Boe | B64C 9/00 244/93 |
| 2006/0214063 A1* | 9/2006 | Firuz | G05D 1/0202 244/175 |
| 2008/0188999 A1 | 8/2008 | Mathieu et al. | |
| 2011/0137496 A1 | 6/2011 | Everett et al. | |
| 2013/0289802 A1 | 10/2013 | Beaufrere | |
| 2016/0200419 A1* | 7/2016 | Moore | B64C 5/02 701/4 |

(Continued)

FOREIGN PATENT DOCUMENTS

| | | |
|---|---|---|
| CA | 2916118 A1 | 12/2014 |
| CN | 109515685 A | 3/2019 |
| EP | 3020630 A1 | 5/2016 |

OTHER PUBLICATIONS

"Weighing Computation", Airplane Operations Manual 3929-800, Praetor 600 by Embraer, Apr. 6, 2021, pp. 24-28, (5 pages).

(Continued)

*Primary Examiner* — Khoi H Tran
*Assistant Examiner* — Trang Dang
(74) *Attorney, Agent, or Firm* — Nixon & Vanderhye P.C.

(57) ABSTRACT

An aircraft fly-by-wire control system allows takeoffs with a single initial horizontal stabilizer or trim tab position while maintaining satisfactory rotation times, thus allowing simpler aircraft operation and avoiding the scenario in which the crew does not correctly trim the aircraft (mistrim takeoff scenario) which could reduce safety margins.

17 Claims, 10 Drawing Sheets

(56) References Cited

U.S. PATENT DOCUMENTS

| | | |
|---|---|---|
| 2018/0086430 A1 | 3/2018 | Beaufrere |
| 2018/0088593 A1 | 3/2018 | De Tarso Ferreira et al. |
| 2019/0047683 A1* | 2/2019 | De Souza .......... B64D 45/0005 |
| 2019/0086937 A1* | 3/2019 | Lee ..................... G05D 1/0653 |

OTHER PUBLICATIONS

Extended European Search Report issued in European Application No. 21181729.1 dated Nov. 22, 2021.
Chinese Office Action issued in CN Application No. 202110714003.1 dated Jul. 24, 2025.

* cited by examiner

Condition at the beginning of takeoff acceleration -
Fixed horizontal stabilizer and elevator at neutral.

Upon reaching the rotation speed the pilot will command nose up and the elevator will move trailing edge up. If the CG is at the FWD limit, the aircraft will not respond immediately and the elevator will reach values close to the detent (maximum allowable position).

Upon a given persistency (e.g. 0.5 seconds) with the elevator deflected and with limited aircraft response, the horizontal stabilizer or trim tab will move trailing edge up and help the aircraft generate the rotation moment to perform the lift off.

After the aircraft is airborne and the amount of elevator returned towards neutral position, the function will disengage and the aircraft will transition to the usual flight control laws.

LONGITUDINAL TRIM CONTROL MOVEMENT DURING TAKEOFF ROTATION

CROSS-REFERENCE TO RELATED APPLICATIONS

This application claims benefit of U.S. Provisional Patent Application No. 63/043,897 filed Jun. 25, 2020, which is incorporated herein by reference in its entirety and for all purposes.

TECHNICAL FIELD

This technology is related to aircraft flight control, and more particularly to the takeoff performance of fly-by-wire aircraft, providing simpler and more efficient takeoff procedures and safety margins.

BACKGROUND

The nose-up/nose-down pitch of an aircraft is a critical parameter for correct takeoff and flight. An aircraft is said to be pitch "trimmed" when no force or correction needs to be exerted on the flight controls to maintain the aircraft in the desired nose-up/nose-down pitch attitude for steady flight. Many modern aircraft automatically adjust trim to maintain level flight once the aircraft is in flight.

Achieving a certain desired degree of nose-up/nose-down pitch trim during takeoff allows the aircraft to roll down the runway without the front wheel leaving the ground but still having the proper pitch attitude to rotate when rotation speed VR is attained and the pilot pulls back on the yoke or stick. See e.g., US-2018-0088593-A1. Pilots typically manually set ("dial in") takeoff pitch trim (e.g., by rotating a trim wheel) to achieve desired pitch trim for takeoff.

Longitudinal CG positions affect the nose-up/nose-down pitch trim of an aircraft for both takeoff and level flight. Different aircraft fuel and payload configurations and weight distributions lead to different configurations in longitudinal center of gravity (CG) positions. Such different CG configurations can change the pitch trim of the aircraft. Pilots are usually given a "load sheet" prior to takeoff that indicates takeoff CG position based on (a) amount of fuel on board (as well as distribution of fuel between different fuel tanks) and (b) cargo weight/distribution. The pilot uses this "load sheet" to dial in pitch trim for takeoff. In order to determine the aircraft weight and the CG arm, it is necessary to add to the Basic Empty Weight (BEW) of the aircraft all the weight and moment variations related to the loaded items. The total moment divided by the total weight gives the final CG arm. The CG arm must be converted into % MAC (Mean Aerodynamic Chord). The pair Weight/CG must be checked against the Weight/CG envelope limits. FIG. 1A shows an example computation of CG.

Aircraft pitch trim is also affected by a change in thrust of an engine that is located above or below the CG, a change in horizontal tail angle or trim tab position (see FIG. 2), and deflection of an elevator. The pitch trim setting is thus a function of a variety of factors: the aircraft's take-off weight, CG position, flap and other control surface positions and engine thrust (engine thrust from underneath the wing typically creates a nose up attitude). Before takeoff, the pilot adjusts the trim wheel to change the position of the horizontal stabilizer and/or the trim tabs on elevators on the tail of the aircraft to compensate for these effects to achieve desired aircraft nose-up/nose-down trim for takeoff.

Current aircraft, according to the CG configuration at take-off condition, provide guidance to the crew through an aircraft flight manual or some on-board display on how to trim the horizontal stabilizer or trim tab before takeoff, inside some pre-defined limits called a "green band", in order to achieve proper pitch trim for takeoff. FIG. 1B shows an example trim indicator with a "green band". Other example "green bands" are placed on the trim wheel so the flight crew can see whether the pitch trim they are dialing in is outside of predetermined limits.

The "Aircraft Nose Up" (ANU) trim may be determined through the existing CG as a percentage of the Mean Aerodynamic Cord ("MAC"). The % MAC converts into units of ANU which should be within the limiting green band area, indicating the allowed "Stab Trim" range for takeoff for the current aircraft configuration.

If the crew does not adjust the horizontal stabilizer or trim tab to the correct CG value (a mistrim take-off scenario), it can impact aircraft takeoff controllability and performance which might affect compliance with certification requirements—leading to increased takeoff field lengths and reduction in safety margins. Accordingly, a Takeoff Configuration Warning will typically sound when a takeoff is attempted with the pitch trim outside of the limiting "green band." This usually requires the flight crew to potentially abort the takeoff and manually readjust the horizontal stabilizer or trim tab in order to achieve a pitch trim that is within "green band" limits for takeoff.

BRIEF DESCRIPTION OF THE DRAWINGS

FIGS. 2A-2D are together a flip chart animation showing the dynamic operation of an aircraft, wherein:

FIG. 2A shows an example condition at the beginning of takeoff acceleration—Fixed horizontal stabilizer and elevator at neutral.

FIG. 2B shows that upon reaching the rotation speed the pilot will command nose up and the elevator will move trailing edge up. If the CG is at the forward limit, the aircraft will not respond immediately and the elevator will reach values close to the detent (maximum allowable position).

FIG. 2C shows that upon a given persistency (e.g. 0.5 seconds) with the elevator deflected and with limited aircraft response, the horizontal stabilizer or trim tab will move trailing edge up and help the aircraft generate the rotation moment to perform the lift off.

FIG. 2D shows that after the aircraft is airborne and the amount of elevator is returned towards neutral position, the function will disengage and the aircraft will transition to the usual flight control laws.

DETAILED DESCRIPTION OF EXAMPLE EMBODIMENTS

The proposed solution addresses a mistrim scenario by providing an initial single horizontal stabilizer position for takeoff, which is automatically set/adjusted at power on.

Given certain parameters during the aircraft's rotation dynamics (e.g., airspeed, elevator position, inceptor displacement, pitch rate, weight on wheels (WOW) sensor, thrust lever angles), the example embodiment adjusts the horizontal stabilizer in the ANU (aircraft nose up) sense to guarantee satisfactory rotation of the aircraft. Under control of a fly-by-wire control system, the horizontal stabilizer or trim tab will move, limited to some amount of time or time period (e.g. 3 seconds), in a sense or direction to provide satisfactory rotation motion.

Aircraft Phases of Flight

FIGS. 2A-2D are together a flip chart animation showing the dynamic operation of an aircraft before and during takeoff. To view the animation, view this patent electronically using a full page view and use your "page down" key to advance in the animation.

Figure 1A:
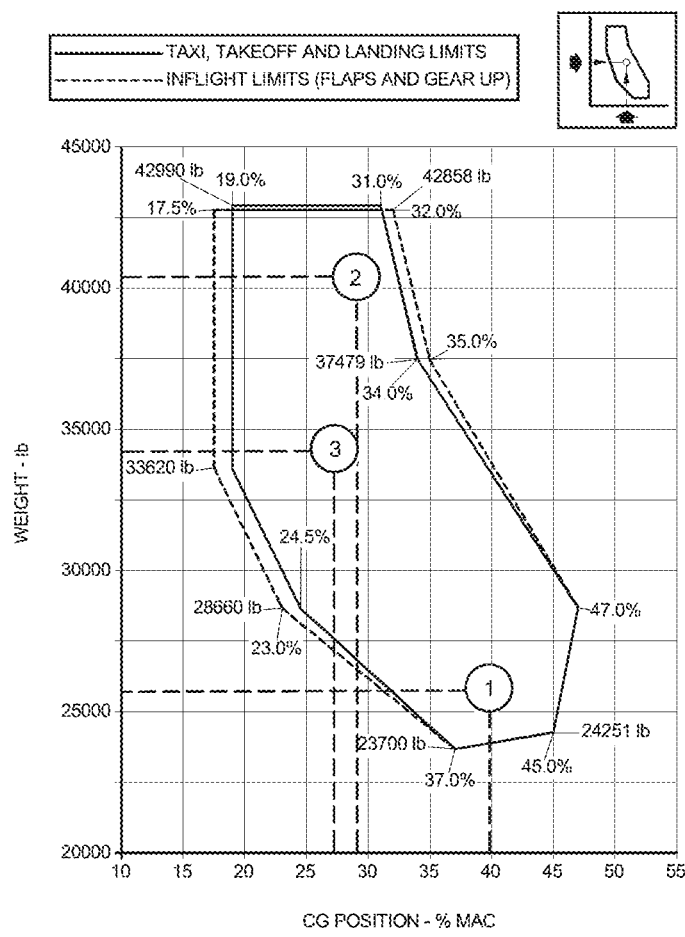
FIG. 1A shows an example load sheet graph.
Figure 1B:
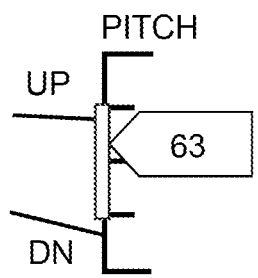
FIG. 1B shows an example stabilizer trim setting with a "green band".
Figure 2:
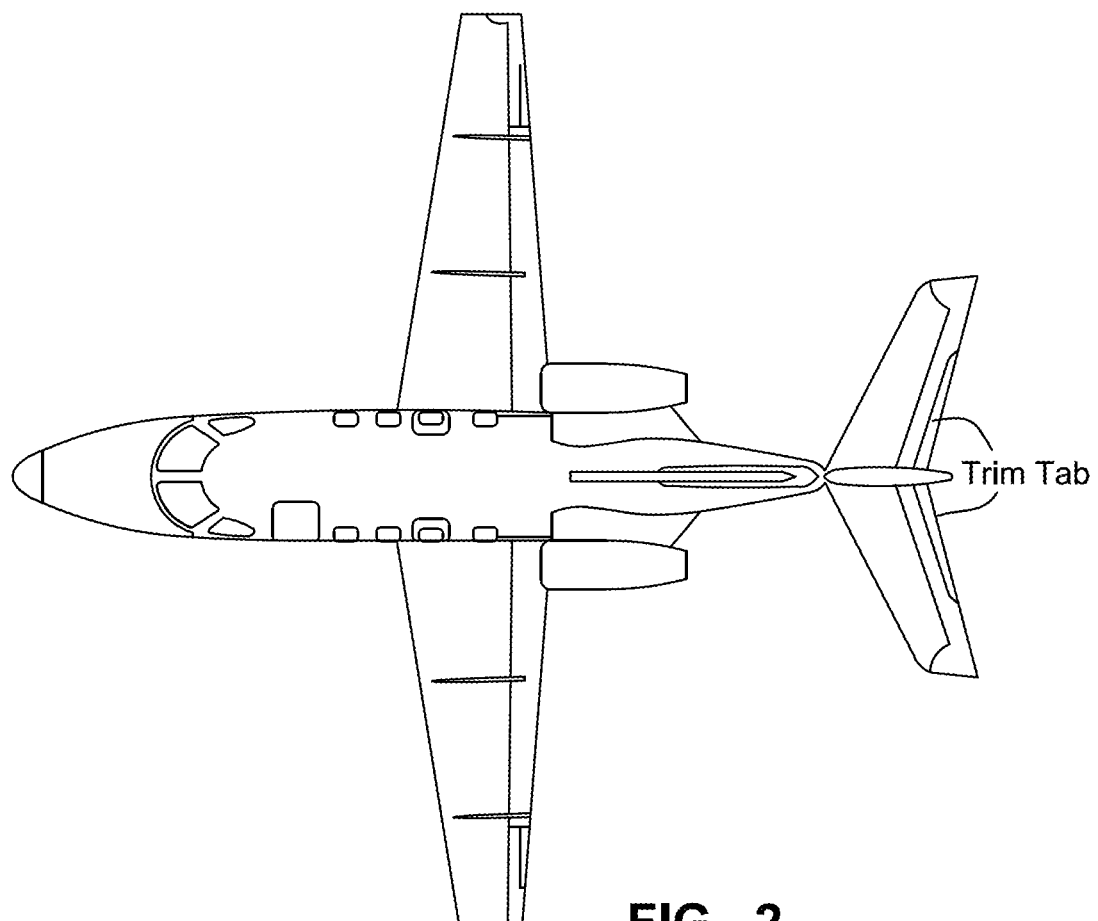
FIG. 2 shows an example aircraft with a trim tab.
Figure 2A:
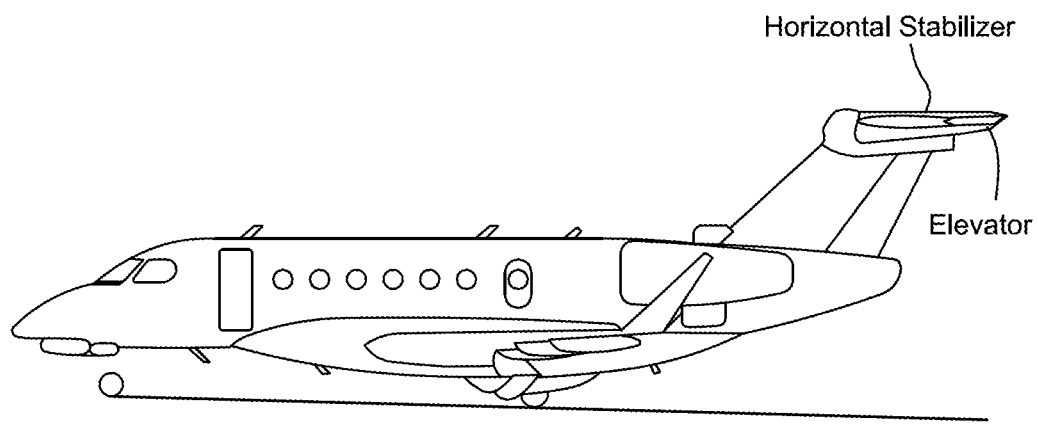

FIG. 2A shows an example condition at the beginning of takeoff acceleration, with a fixed horizontal stabilizer and elevator at neutral position. Note the position of the horizontal stabilizer and the elevator. From this position, the aircraft will begin to accelerate down the runway with its wheels remaining in contact with the ground.

Figure 2B:
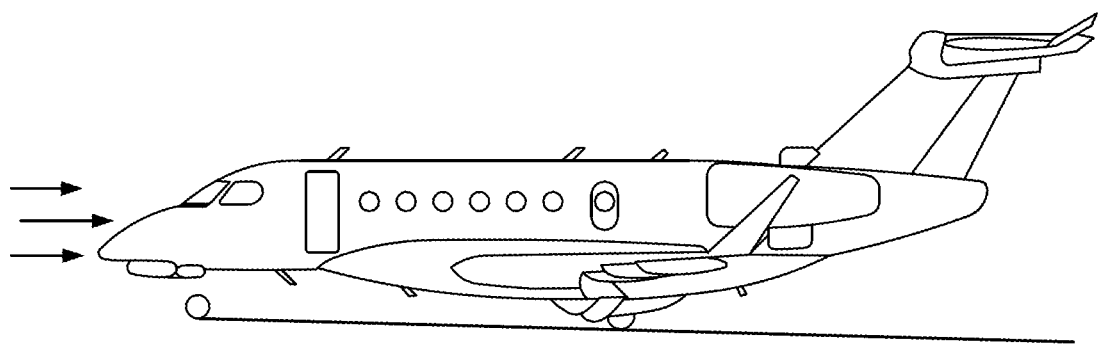

FIG. 2B shows that upon reaching the rotation speed (VR), the pilot will command nose up and the elevator will move the trailing edge up. If the CG is at the FWD limit, the aircraft will not respond immediately and the elevator will reach values close to the detent (maximum allowable position).

Figure 2C:
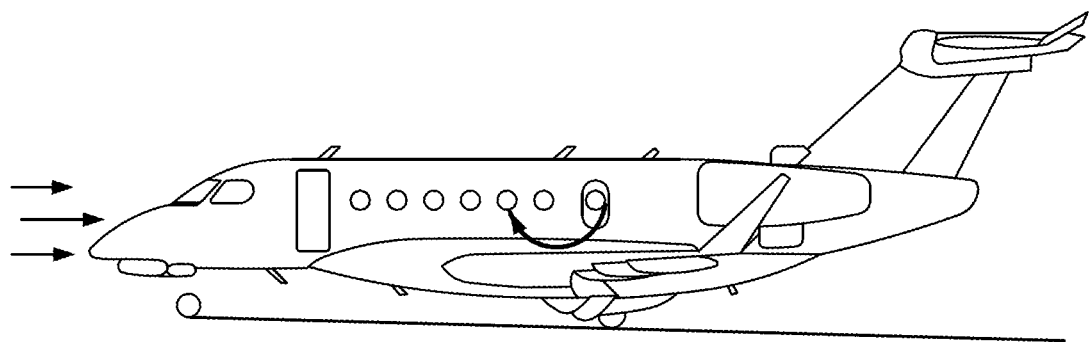

FIG. 2C shows that upon a given persistency (e.g. time period T1=0.5 seconds) with the elevator deflected and with limited aircraft response, the horizontal stabilizer or trim tab will move the trailing edge up and help the aircraft generate the rotation moment to perform the lift off during a limited time period T2 (e.g., =3 seconds).

Figure 2D:
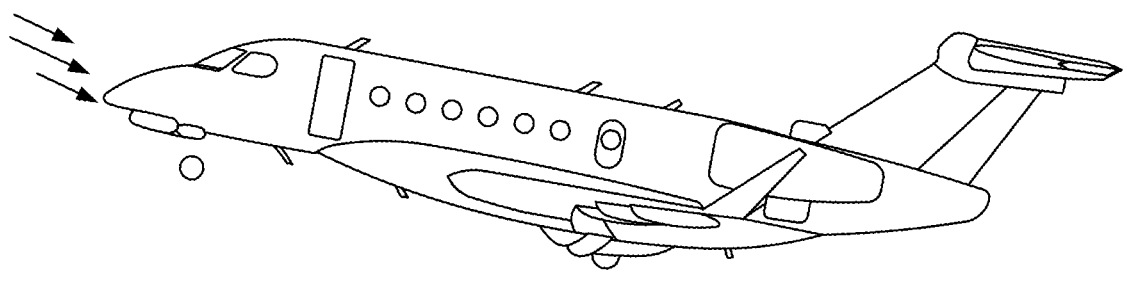

FIG. 2D shows that after the aircraft is airborne and the amount of elevator is returned towards neutral position, the trim function will disengage and the aircraft will transition to the usual flight control laws.

Figure 2E:
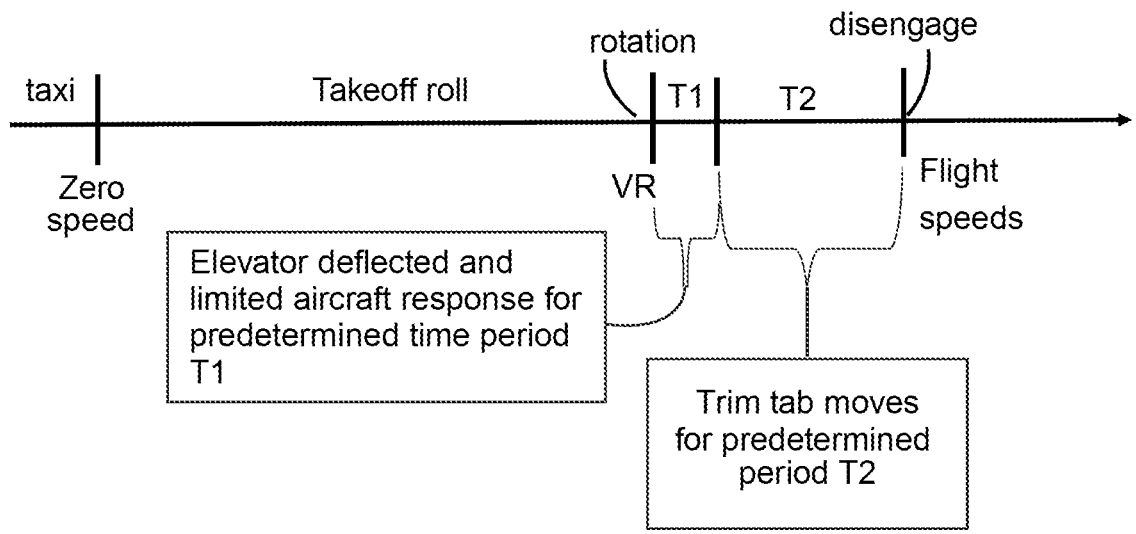
FIG. 2E shows an example non-limiting timing diagram.

FIG. 2E shows an example time line. The aircraft will first taxi into a position at the head of the runway and rest until the pilot issues the command to take off. The horizontal stabilizer and elevator are in their neutral positions during this time. FIG. 2A. Under pilot command, the aircraft then begins to roll down the runway, gathering speed as it proceeds down its takeoff roll. Upon attaining rotation speed VR, the pilot commands the aircraft to rotate by deflecting the elevator to a nose-up position. FIG. 2B. The example embodiment automatic system uses sensors to detect limited aircraft response (i.e., failure to rotate) during a period T1 despite the elevator begin at its detent position. If limited response is detected, the example embodiment automatic system intervenes by automatically moving the horizontal stabilizer and/or the trim tab during a period T2 to help the aircraft generate the rotation movement to perform lift off. FIG. 2C. Once period T2 expires, the example embodiment automatic system disengages and the aircraft will transition to the usual flight control laws. FIG. 2D.

Figure 3:
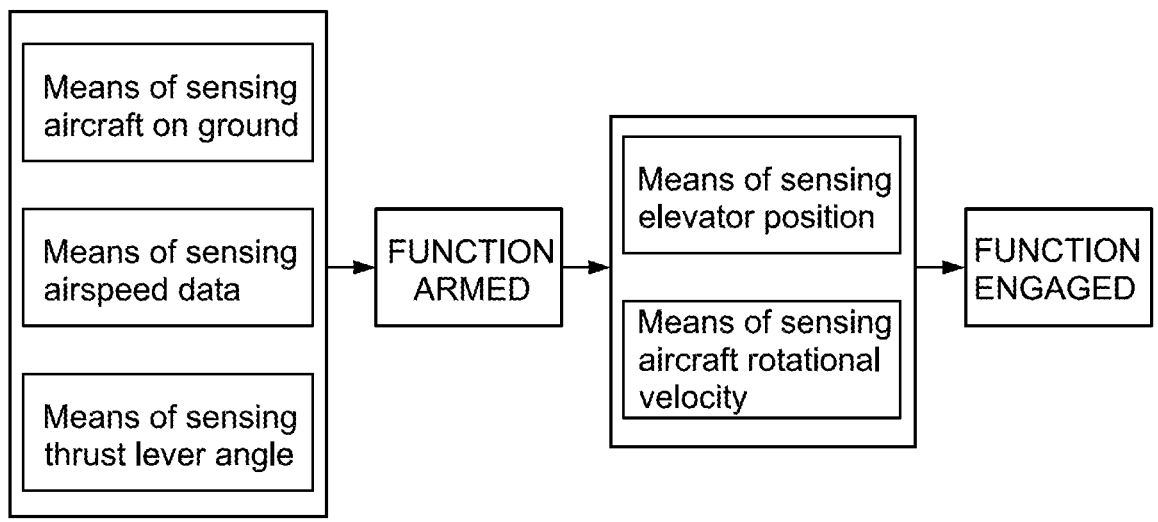
FIGS. 3, 3A and 3B show an example fly-by-wire aircraft control architecture.
Figure 3A:
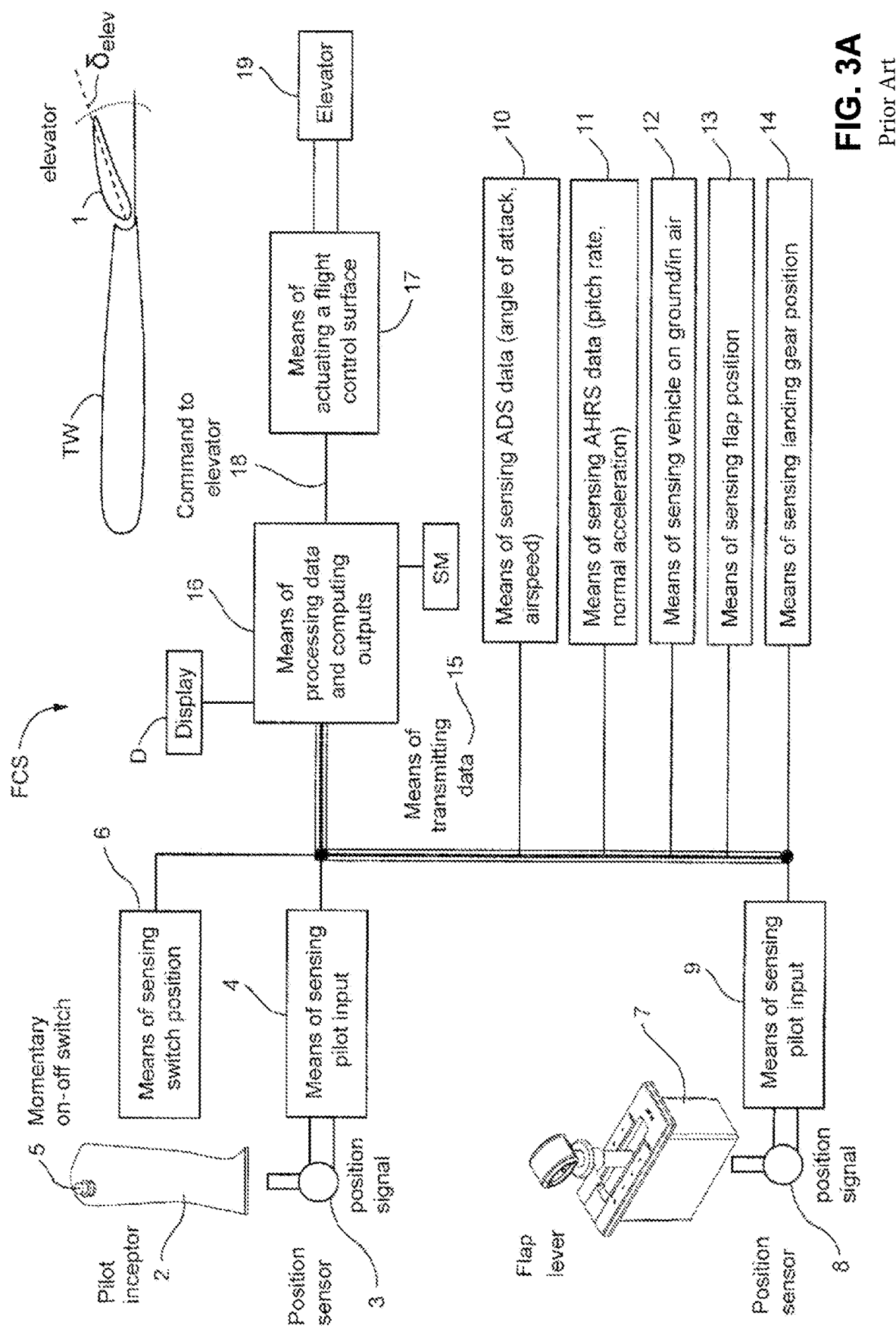
Figure 3B:
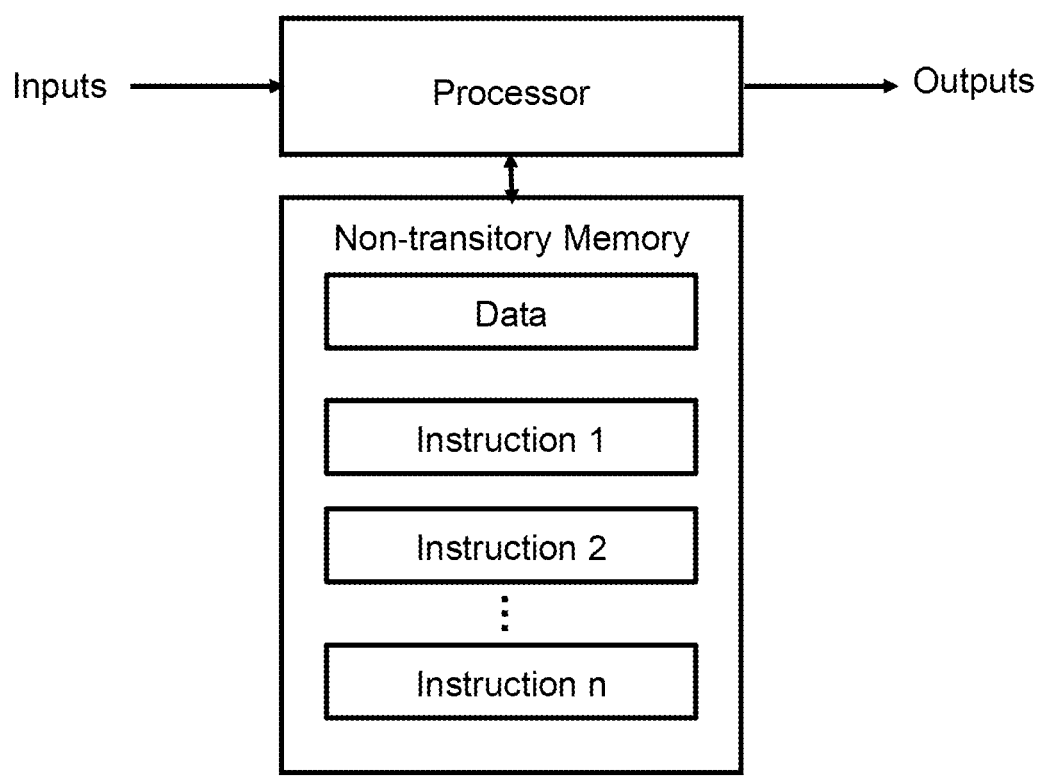

FIG. 3A shows an example aircraft A control system including components 1, 2, 3, 4, 5, 6, 7, 8, 9, 10, 11, 12, 13, 14, 15, 16, 17. Two elevators or trim tabs (1) are installed in the horizontal stabilizer/tail wing TW for pitch control, and two flaps F are installed in the main wings W for controlling lift and to slow the aircraft during landing. The tail elevators/trim tabs 1 control the pitch of the aircraft A during takeoff, flight and landing. The pilot in the cockpit C interacts with the aircraft A using the inceptor 2, 5 and flap lever 7 to control the control surfaces including flaps F and elevators or trim tabs 1. A fly-by-wire electronic flight control system (see FIG. 3B) accepts pilot input (e.g., through manual manipulation of a flap lever 7 and a pilot interceptor 2), and uses automatic control laws typically implemented by a digital (computer) processing system (3, 4, 6, 8, 9-16) coupled to non-transitory memory storing data and instructions (see FIG. 3B) to control actuators (18, 19) that in turn control the positions of flaps F and elevator 19/trim tabs 1.

Figure 4:
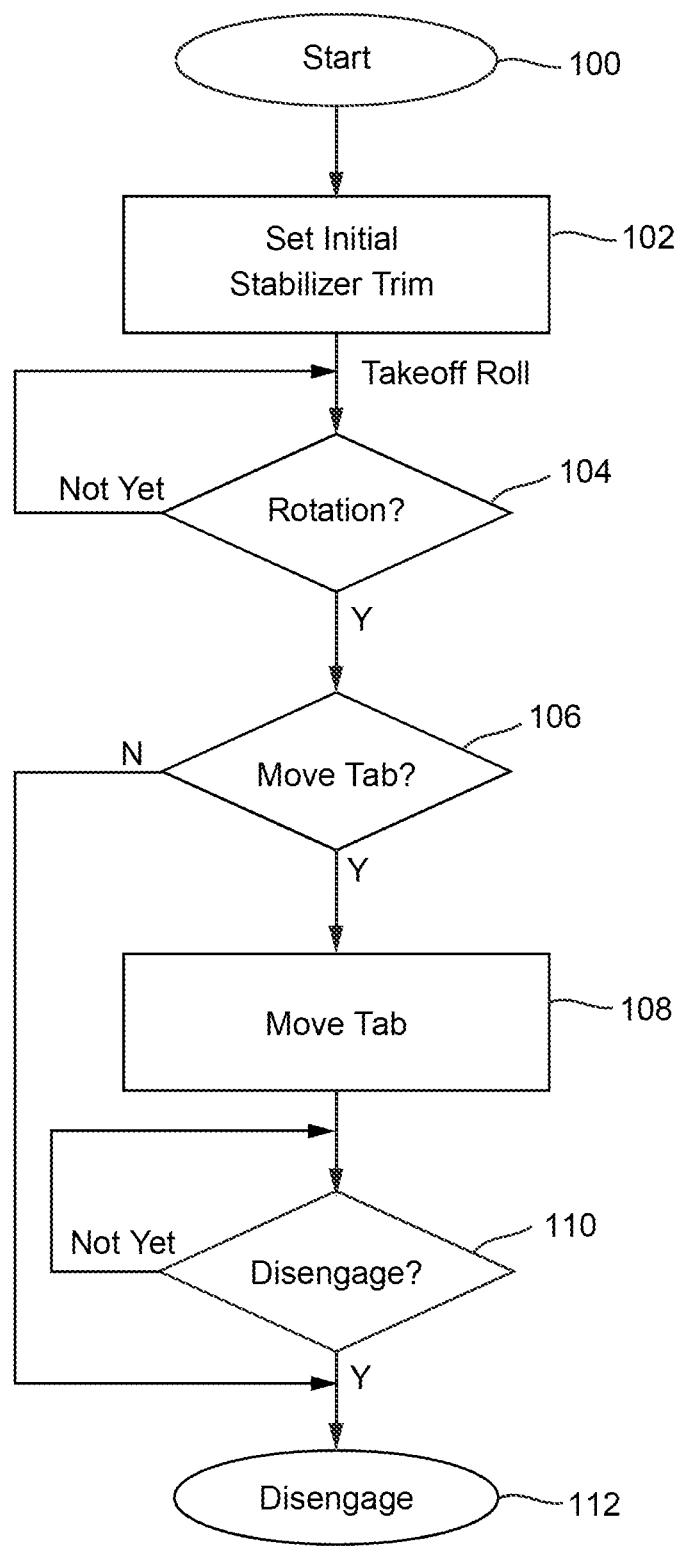
FIG. 4 shows example non-limiting Function logic of an example non-limiting processor-based fly-by-wire system controlled by a flight computer.

FIG. 4 shows an example non-limiting flow chart of program control steps performed by the fly-by-wire system. In one example embodiment, the initial takeoff trim position prior to takeoff initiation (block 102; see FIG. 2A) is defined in order to comply with all these conditions:

Takeoff with limit AFT CG (this case will not require the horizontal stabilizer or trim tab movement at takeoff rotation)—the initial horizontal stabilizer or trim tab position prior to takeoff initiation has to allow that the nose landing gear stays on the ground up to the initial rotation speed (VR).

Takeoff with limit FWD CG (this case will require the horizontal stabilizer or trim tab movement at takeoff rotation)—the horizontal stabilizer or trim tab after moving from its initial position at the takeoff rotation for a limited time (e.g. T2=3 seconds), has to provide satisfactory performance and handling qualities during takeoff rotation. At this point, the system is "armed" as shown in FIG. 3 and begins to sense weight on wheels (to determine if the aircraft is still on the ground), the airspeed data (to determine when the aircraft reaches the rotational velocity VR), and thrust lever angle (to determine how much thrust the pilot has commanded the engines to produce). Note that the system will not arm if the CG is AFT of a predetermined position on the aircraft—only if it is FWD of that predetermined position. This determination is typically made by the processor in response to the load sheet information.

After taxiing is finished, the aircraft advances to a position at the center of the runway, and (usually in response to a clearance from the air traffic controller), begins its takeoff roll (the process whereby an aircraft is aligned with the runway centerline and the aircraft is moving forward with the intent to take off). The pilot at this point increases the angle of the engine thrust levers, commanding the engines to produce substantial or maximal thrust—and the aircraft begins picking up speed as it rolls down the runway. During this takeoff roll down the runway, as the aircraft accelerates and a possible rejected takeoff (RTO) scenario occurs with limit AFT CG, the nose landing gear has to stay on ground throughout the maneuver. Accordingly, the processor will not pitch up the aircraft further because this would increase the chance of a tail strike.

The system then detects when the aircraft achieves rotation speed (e.g., speed=VR). At this point, the pilot will command the nose up by pulling back on the yoke or stick. This will cause the elevator to move, trailing edge up. If the aircraft is properly pitch trimmed for the current loading and thrust, the aircraft will rotate and leave the ground without any need for automatic assist. However, if the CG is at the FWD limit, the aircraft will not respond immediately and the pilot will continue to pull back on the inceptor or stick such that the elevator will reach values close to detent (i.e., the maximum allowable position within its range of motion). This means the elevator is controlling a maximum pitch up, but the aircraft still is not rotating. If such a condition persists for more than certain time period (e.g., T1=0.5 seconds), instead of immediately sounding an alarm for an RTO (rejected takeoff), the fly by wire system automatically provides an assist by controlling the horizontal stabilizer and/or trim tab to move the trailing edge up and help the aircraft generate the pitch-up rotational movement to perform the liftoff (after the aircraft attains the V1≤VR "commit to fly" speed, no RTO alarm will sound; the system has to make sure all takeoffs within the weight and CG envelope to be certified will provide satisfactory rotation). The system controls the horizontal stabilizer and/or the trim tab for a limited time duration (e.g., T2=3 seconds) while monitoring pitch response (see "Function Engaged" block of FIG. 3).

If the aircraft begins to rotate satisfactorily and there is still plenty of runway, the fly by wire system continues to control the horizontal stabilizer and/or trim tabs to continue to automatically command the aircraft to pitch up and thus rotate. Once the aircraft is airborne and the amount of elevator is returned to the normal position (e.g., by the pilot pushing back on the yoke or stick), the fly by wire system disengages the trim override function and the aircraft will transition to the usual flight control laws.

The position of the horizontal stabilizer and trim tab after moving for a limited amount of time (e.g. 3 seconds) must guarantee an optimal minimum unstick speed (VMU) (i.e., the calibrated airspeed at and above which the airplane can safely lift off the ground, and continue the takeoff; see Joint Aviation Requirements (JAR) 25.107 (d)). VMU speeds for an aircraft are selected throughout the range of thrust-to-weight ratios to be certificated and are typically established from free air data verified by ground takeoff tests. The position and movement time of the horizontal stabilizer and trim tab in example embodiments provides proper VMUs consistent with certification of the aircraft.

In order to define when the horizontal stabilizer or trim tab will move during the takeoff rotation (blocks 104-108), some constraints are used:

The movement of the horizontal stabilizer or trim tab during the takeoff rotation (see FIG. 2B, 2C) will begin (blocks 106, 108) when all the conditions below are satisfied:
 (1) Aircraft is (still) on the ground.
 (2) Elevator or longitudinal inceptor control is close to its detent (maximum allowable position) without pitch rate response from the aircraft for a predetermined time (e.g. 0.5 seconds).
 (3) Thrust lever angles are at takeoff/go-around (TOGA) position.
 (4) Calibrated airspeed is above a certain airspeed (e.g. VMU-10 kt).

In other words, when the aircraft reaches rotation speed, if the aircraft sensors determine that the elevator is deflected and the aircraft response is limited for a certain time period (e.g., 0.5 seconds), an automatic pitch-up function is invoked.

The horizontal stabilizer or trim tab movement will cease (block 110; see FIG. 2D) when any of the conditions below are satisfied:
 (1) Elevator returns to a value closer to neutral.
 (2) Thrust lever angles are reduced to idle position (indicating the pilot has aborted the takeoff).
 (3) The movement duration becomes larger than the predefined maximum (e.g. 3 seconds).

In other words, the fly by wire system will discontinue its forced commanding of a trimming control surface to pitch up if the pilot commands the elevator to return to a neutral or closer to neutral value (this could indicate an RTO, or that rotation is complete); or if the pilot returns the engine thrust lever controls to idle (thus indicating an RTO); or the override duration times out.

This technology will allow takeoffs with a single initial horizontal stabilizer or trim tab position while maintaining satisfactory rotation times thus allowing simpler aircraft operation and avoid the scenario in which the crew does not correctly trim the aircraft (mistrim takeoff scenario) which could reduce safety margins.

In one embodiment, the automatic trim function is not considered to be an "override" because the pilots are able to counter-act it by pressing the pitch trim switch and regain authority.

All patents and publications cited herein are incorporated by reference as if expressly set forth.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

Some Abbreviations

| AFT | AFTWARD |
|---|---|
| ANU | AIRCRAFT NOSE UP |
| CG | CENTER OF GRAVITY |
| FWD | FORWARD |
| MAC | MEAN AERODYNAMIC CHORD |
| RTO | REJECTED TAKEOFF |
| TOGA | TAKEOFF/GO-AROUND |
| VMU | MINIMUM UNSTICK SPEED |
| VR | ROTATION SPEED |
| V1 | "COMMIT TO FLY" SPEED |
| WOW | WEIGHT ON WHEELS |

The invention claimed is:

1. A method of controlling an aircraft during takeoff rotation comprising:
 sensing a rotation command, by a pilot inceptor, to deflect an elevator of the aircraft to a nose-up position for rotation of the aircraft;
 sensing, by at least one sensor, rotation pitch rate response of the aircraft to the rotation command;
 sensing, by the at least one sensor, position of the elevator; and
 automatically moving, by at least one processor, a pitch trimming control surface from an initial takeoff position to a pitch up position to assist the aircraft in pitching up to generate lift off rotation of the aircraft when all the following conditions are satisfied:
  a. the aircraft is on the ground;
  b. the position of the elevator or a longitudinal inceptor position control that controls position of the elevator is close to a maximum allowable elevator position without the rotation pitch rate response from the aircraft for a predetermined time;
  c. thrust lever angle is at a takeoff or go-around position; and
  d. calibrated airspeed is above a certain airspeed.

2. The method of claim 1 wherein the rotation command is inputted by a pilot.

3. The method of claim 1 wherein the pitch trimming control surface comprises a horizontal stabilizer or a trim tab.

4. The method of claim 1 further including defining the initial takeoff position of the pitch trimming control surface prior to takeoff initiation.

5. The method of claim 1 wherein the at least one processor ceases moving the pitch trimming control surface when any of the following conditions are satisfied:
   a. the elevator returns to a position closer to neutral;
   b. the thrust lever angle is reduced to idle position indicating a pilot has aborted takeoff;
   c. duration of moving the pitch trimming control surface exceeds a predefined maximum duration.

6. A system for controlling an aircraft during takeoff rotation comprising:
   at least one processor operatively coupled to a pilot inceptor input and a control surface actuator output, the at least one processor performing operations based on executing instructions stored in non-transitory memory, the operations comprising:
   sensing a rotation command, by a pilot inceptor, to deflect an elevator of the aircraft to a nose-up position for rotation of the aircraft;
   sensing, by at least one sensor, rotation pitch rate response of the aircraft to the rotation command;
   sensing, by the at least one sensor, position of the elevator; and
   automatically moving, by the at least one processor, a pitch trimming control surface from an initial takeoff position to a pitch up position to assist the aircraft in pitching up to generate lift off rotation of the aircraft when all the following conditions are satisfied:
   a. the aircraft is on the ground;
   b. the position of the elevator or a longitudinal inceptor position control that controls position of the elevator is close to a maximum allowable elevator position without the rotation pitch rate response from the aircraft for a predetermined time;
   c. thrust lever angle is at a takeoff or go-around position; and
   d. calibrated airspeed is above a certain airspeed.

7. The system of claim 6 wherein the rotation command is inputted by a pilot.

8. The system of claim 6 wherein the pitch trimming control surface comprises a horizontal stabilizer or a trim tab.

9. The system of claim 6 wherein the at least one processor is further configured to define the initial takeoff position of the pitch trimming control surface prior to takeoff initiation.

10. The system of claim 6 wherein the at least one processor is further configured to cease moving the pitch trimming control surface when any of the following conditions are satisfied:
    a. the elevator returns to a position closer to neutral;
    b. the thrust lever angle is reduced to idle position indicating a pilot has aborted the takeoff;
    c. duration of moving the pitch trimming control surface exceeds a predefined maximum duration.

11. The system of claim 6 wherein the at least one processor is further configured to condition performing an operation of automatically moving a pitch trimming control surface to pitch up on whether center of gravity of the aircraft is aft or forward of a predetermined aircraft position.

12. An aircraft comprising:
    an aerodynamic body including an elevator and a horizontal stabilizer and/or a trim tab; an elevator actuator; at least one actuator of the horizontal stabilizer and/or the trim tab;
    a plurality of sensors including at least one sensor configured to sense pitch rate;
    a fly by wire control system configured to enable a pilot to control position of the elevator via the elevator actuator by operating a pilot inceptor;
    the fly by wire control system including at least one processor operatively coupled to the plurality of sensors, the pilot inceptor and to the at least one actuator of the horizontal stabilizer and/or the trim tab, the at least one processor performing operations during takeoff rotation based on executing instructions stored in non-transitory memory, the operations comprising:
    sensing a rotation command based on the pilot inceptor to deflect the elevator to a nose-up position for rotation of the aircraft;
    sensing, by the plurality of sensors, rotational pitch rate response of the aircraft to the rotation command;
    sensing, by the plurality of sensors, position of the elevator; and
    automatically moving, by the at least one processor, a pitch trimming control surface from an initial takeoff position to a pitch up position to assist the aircraft in pitching up to generate lift off rotation of the aircraft when all the following conditions are satisfied:
    a. the aircraft is on the ground;
    b. the position of the elevator or a longitudinal inceptor position control that controls position of the elevator is close to a maximum allowable elevator position without the rotation pitch rate response from the aircraft for a predetermined time;
    c. thrust lever angle is at a takeoff or go-around position; and
    d. calibrated airspeed is above a certain airspeed.

13. The aircraft of claim 12 wherein the rotation command is inputted by the pilot.

14. The aircraft of claim 12 wherein the at least one processor automatically moves the trim tab after the aircraft has a speed that exceeds rotation speed.

15. The aircraft of claim 12 wherein the at least one processor is further configured to define the initial takeoff position of the horizontal stabilizer and/or the trim tab prior to takeoff initiation.

16. The aircraft of claim 12 wherein the at least one processor is further configured to cease automatic control of the horizontal stabilizer and/or the trim tab when any of the following conditions are satisfied:
    a. the elevator returns to a position closer to neutral;
    b. the thrust lever angle is reduced to idle position indicating the pilot has aborted takeoff;
    c. duration of the at least one processor controlling the horizontal stabilizer and/or the trim tab exceeds a predefined maximum duration.

17. The aircraft of claim 12 wherein the at least one processor is further configured to perform an operation of automatically moving the horizontal stabilizer and/or trim tab to pitch up based on whether a center of gravity of the aircraft is aft or forward of a predetermined aircraft position.

* * * * *